United States Patent [19]

Nakamata

[11] Patent Number: 4,636,609

[45] Date of Patent: Jan. 13, 1987

[54] PROCESS FOR JOINING DIFFERENT KINDS OF SYNTHETIC RESINS

[75] Inventor: Hideo Nakamata, Toyota, Japan

[73] Assignee: Toyota Jidosha Kabushiki Kaisha, Japan

[21] Appl. No.: 720,282

[22] Filed: Apr. 4, 1985

[30] Foreign Application Priority Data

Apr. 10, 1984 [JP] Japan .................................. 59-72256

[51] Int. Cl.⁴ .............................................. B23K 26/00
[52] U.S. Cl. ....................... 219/121 LD; 219/121 LR
[58] Field of Search ................. 219/121 LC, 121 LD, 219/121 L, 121 LM, 121 LQ, 121 LR; 156/272.8, 276, 229, 275.3, 308.2

[56] References Cited

U.S. PATENT DOCUMENTS 3,560,291  2/1971  Foglia et al. ................. 156/272.8 X
3,787,873  1/1974  Sato et al. ................. 219/121 LM X
3,989,778  11/1976 Osborne ................... 219/121 LC X

*Primary Examiner*—C. L. Albritton
*Attorney, Agent, or Firm*—Parkhurst & Oliff

[57] ABSTRACT

A process for joining a first kind of synthetic resin to a second kind of synthetic resin includes several steps. A first step is providing the first kind of synthetic resin, which may include fillers, e.g., glass fibers. A second step is setting a second contact surface of the second kind of synthetic resin on a first contact surface of the first kind of synthetic resin. A third step is exposing an outer surface of the second kind of synthetic resin to a laser beam. The second kind of synthetic resin transmits the laser beam to the first kind of synthetic resin, which stores up heat of the laser beam. The second contact surface of the second kind of synthetic resin and the first contact surface of the first kind of synthetic resin are melted by the heat of the laser beam. A plurality of projections and a plurality of recesses are formed on both the first contact surface of the first kind of synthetic resin and the second contact surface of the second kind of synthetic resin. A plurality of the projections of the first kind of synthetic resin engage with a plurality of the recesses of the second kind of synthetic resin. If fillers are provided, at least some of the will extend between the first and second synthetic resins. Accordingly, the second kind of synthetic resin is securely joined to the first kind of synthetic resin.

20 Claims, 11 Drawing Figures

PROPORTION OF GLASS FILLER IN STYRENE ACRYLONITRILE COPOLYMER

PROCESS FOR JOINING DIFFERENT KINDS OF SYNTHETIC RESINS

BACKGROUND OF THE INVENTION

The present invention relates to a process for joining differing kinds of synthetic resin to each other, and more particularly to a process for joining them using the heat of a laser beam.

In a first conventional process for physically joining synthetic resins, each of the synthetic resins has a contact surface thereon. A metal mesh is disposed on the contact surfaces of the synthetic resins, and the mesh is sandwiched between both of the synthetic resins. When the mesh is heated, both of the contact surfaces of the synthetic resins are melted by the heat of the mesh. Pressure then is applied to the outsides of the synthetic resins to press them together, and the synthetic resins are cooled. As a result of this first conventional process, one of the synthetic resins is joined to the other of the synthetic resins.

In this first conventional process, both synthetic resins normally are the same kind of synthetic resins so that both will have the same melting point, and so that they will blend easily into one another. If different kinds of synthetic resins are used, they may have differing melting points and may not blend easily into one another.

Further, in the first conventional process, a connecting wire is disposed between both of the contact surfaces of the synthetic resins to supply electricity to heat the mesh. Connecting the wire to the mesh between the synthetic resins requires an undesirably high amount of manual labor.

In a second conventional process for chemically joining synthetic resins, each of the synthetic resins has a contact surface thereon, and a bonding compound is disposed between both of the contact surfaces of the synthetic resins. The bonding compound normally is solid and is melted by heat, typically produced by applying high frequency or supersonic waves to the bonding compound. These waves also preferably melt the synthetic resins slightly to improve bonding. After a compressive force is applied to the synthetic resins, the synthetic resins are cooled. As a result of the second conventional process, one of the synthetic resins is joined to the other.

In the second conventional process, the synthetic resins again should be the same kind of synthetic resin, this time so that the bonding compound has the same adhesive properties for bonding to both synthetic resins. If different kinds of synthetic resins are used, the bonding compound may have differing adhesive properties as to the different kinds of synthetic resin. Accordingly, the adhesive strength of the bond to one kind of synthetic resin may be different from the adhesive strength of the bond to a different kind of synthetic resin, i.e., one bond may have a weak adhesive strength. Further, in the second conventional process with different synthetic resins, the synthetic resins may not both be melted by the heat of the high frequency or supersonic waves.

FIG. 11 shows a third conventional process for mechanically joining different kinds of synthetic resins. As shown in FIG. 11, a first plate 51 is mounted on a second plate 52. The first plate 51 is made of polypropylene resin, and the second plate 52 is made of polyethylene resin. The first plate 51 has a first hole 511, and the second plate 52 has a second hole 521 which is congruent with the first hole 511 of the first plate 51. A washer 54 is mounted on the first plate 51, and a screw 55 is inserted into a hole of the washer 54, the first hole 511 and the second hole 521. As a result, the first plate 51 is joined mechanically to the second plate 52.

However, in the third conventional process, the first hole 511 must be opened in the first plate 51, and the second hole 521 must be opened in the second plate 52. Then, the screw 55 must be inserted. Each of these steps is undesirably labor intensive. Further, the screw 55 projects from both of the first plate 51 and the second plate 52, marring the appearance of the final product. In addition, when tension is applied to the first plate 51 and the second plate 52 in the horizontal direction in FIG. 11, the first plate 51 or the second plate 52 may be torn at the first hole 511 or at the second hole 521, respectively.

SUMMARY OF THE INVENTION

The present invention has been developed in view of the facts as described above, and its object is to provide a process for joining different kinds of synthetic resins which enables secure joining of different kinds of synthetic resins.

To accomplish the above-described object, a process for joining different kinds of synthetic resins includes several steps.

A first step includes providing a first kind of synthetic resin, which can store up the heat from a laser beam. A second step includes setting a second kind of synthetic resin on a first kind of synthetic resin. A second contact surface of the second kind of synthetic resin is in contact with a first contact surface of the first kind of synthetic resin. The second kind of synthetic resin can transmit the laser beam. A third step includes exposing an outer surface of the second kind of synthetic resin to the laser beam. The second kind of synthetic resin transmits the laser beam, and the first kind of synthetic resin stores up the heat of the laser beam. As a result, the second contact surface of the second kind of synthetic resin is heated by the heat which is stored up in the first kind of synthetic resin. Accordingly, the first contact surface of the first kind of synthetic resin and the second contact surface of the second kind of synthetic resin are melted by the heat which is stored up in the first kind of synthetic resin. While melted, they are pressed together, and cooled. Thus, the first contact surface of the first kind of synthetic resin is joined securely to the second contact surface of the second kind of synthetic resin.

Further, the outer surface of the second kind of synthetic resin does not have any scars, because the second kind of synthetic resin simply transmits the laser beam and the heat of the laser beam is stored up in the first kind of synthetic resin.

Furthermore, neither the first kind of synthetic resin nor the second kind of synthetic resin can easily be torn, because neither has any holes therein.

BRIEF DESCRIPTION OF THE DRAWINGS

Other objects and novel features of this invention will become more apparent from the description which follows, taken in conjunction with the accompanying drawings, and in which.

DETAILED DESCRIPTION OF THE PREFERRED EMBODIMENTS

Figure 1:
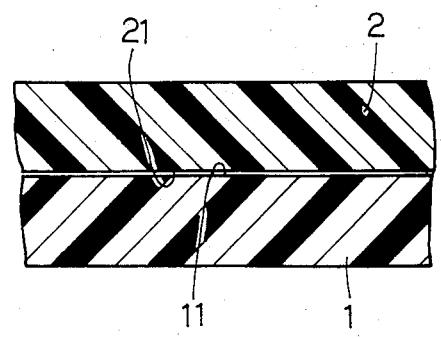
FIG. 1 is a cross-sectional view showing a second step of a first embodiment of a process according to the present invention.
Figure 8:
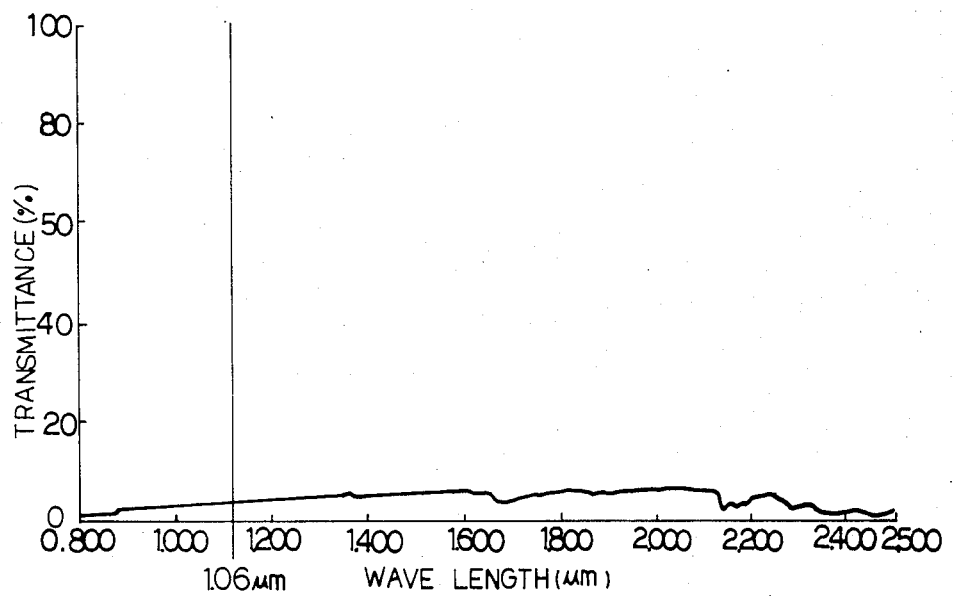
FIG. 8 is a diagram showing the transmittance of 20 wt % glass filler reinforced styrene acrylonitrile copolymer with 0.1 wt % carbon black.

Referring to FIG. 1, a first step of a process for joining different kinds of synthetic resins includes providing a first plate 1 made of a first kind of synthetic resin which can store up the heat of a laser beam. For example, the first kind of synthetic resin can be styrene acrylonitrile copolymer including 0.1 wt % carbon black as an additive. The first plate 1 of this composition is black. As shown in FIG. 8, the styrene acrylonitrile copolymer with carbon black transmits only a little of a Nd:YAG(Nd$^{+3}$:Y$_3$Al$_5$O$_{12}$) laser beam and therefore can store up (absorb) most of the heat of the total amount of the laser beam. At 1.06 $\mu$m, for example, this composition will transmit only about 4% of the beam. Alternatively, the first kind of synthetic resin may be polypropylene resin which includes carbon black as an additive.

Returning to FIG. 1, a second step of the process includes setting a second plate 2 on the first plate 1. The second plate 2 is made of a second kind of synthetic resin. The second plate 2 has a second contact surface 21 which is in contact with a first contact surface 11 of the first plate 1.

Figure 9:
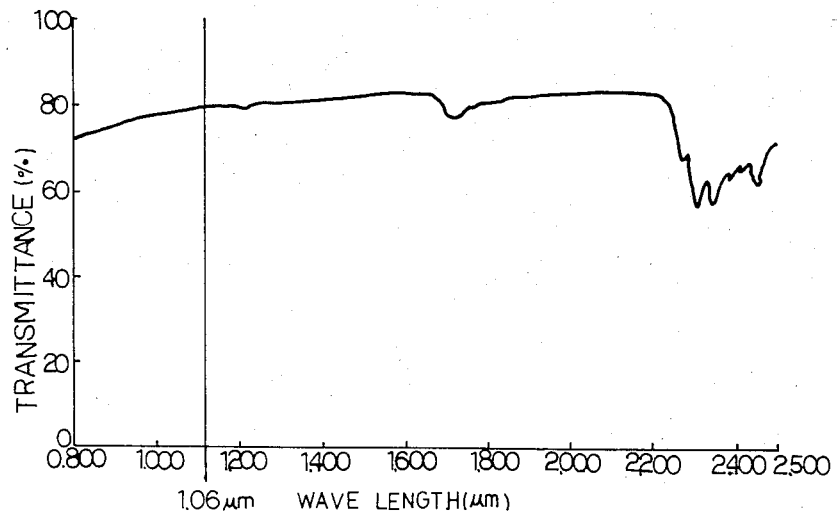
FIG. 9 is a diagram showing the transmittance of polypropylene without any additives.

The second kind of synthetic resin can transmit most of the laser beam, and preferably is polypropylene resin without any absorptive additive. As shown in FIG. 9, when the wavelength of the Nd:YAG laser beam is 1.06 $\mu$m, the polypropylene resin without any additive can transmit about 75% of the total amount of the Nd:YAG laser beam. Alternatively, the second kind of synthetic resin may be styrene acrylonitrile copolymer, 6-nylon resin or 66-nylon resin, all without any absorptive additives. The color of the plate 2 is milky white.

Figure 2:
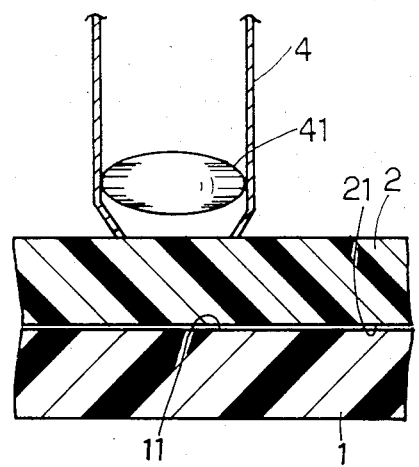
FIG. 2 is a cross-sectional view showing a third step of the process.

As shown in FIG. 2, a third step of the process includes setting a nozzle 4 of the laser beam on an outer surface of the second plate 2, and exposing the outer surface of the second plate 2 to the laser beam. The laser beam radiates from the nozzle 4 through a convex lens 41, and an end of the nozzle 4 preferably is in contact with the outer surface of the second plate 2.

When the outer surface of the second plate 2 is exposed to the laser beam, the second plate 2 transmits the laser beam, and the first plate 1 stores up the heat of the laser beam. As a result, the first contact surface 11 of the first plate 1 and the second contact surface 21 of the second plate 2 are melted by the heat which is stored up in the first plate 1.

A plurality of projections and a plurality of recesses are formed on the first contact surface 11 of the first plate 1 and the second contact surface 21 of the second plate 2, because the laser beam is dispersed in the second plate 2 during transmission. Due to this dispersion, the laser beam concentrates on a plurality of spots which are located on the first contact surface 11 of the first plate 1 and the second contact surface 21 of the second plate 2, and the laser beam melts a plurality of the spots. If the end of the nozzle 4 is not in contact with the outer surface of the second plate 2, a larger plurality of the recesses may be formed by moving the nozzle 4 along the outer surface of the second plate 2 during irradiation by the laser beam.

With the preferred resins, the most suitable laser beam is a Nd:YAG laser beam, however, other laser beams may be used, including: Nd:glass laser beam; ruby laser beam; helium:neon (He:Ne) gas laser beam; krypton (Kr) gas laser beam; argon (Ar) gas laser beam; hydrogen (H$_2$) gas laser beam and nitrogen (N$_2$) gas laser beam.

With the preferred resins, a suitable wavelength of the laser beam for joining different kinds of synthetic resins is about 1.06 $\mu$m and less. When the wavelength of the laser beam is more than 1.06 $\mu$m, the first kind of synthetic resin cannot be joined to the second kind of synthetic resin, because the second kind of synthetic resin cannot transmit the laser beam.

With the preferred resins, the laser beam should be from 5 W through 100 W in power in order to melt the first contact surface 11 of the first plate 1 and the second contact surface 21 of the second plate 2. When the generating power of the laser beam is less than 5 W, the first contact surface 11 of the first plate 1 and the second contact surface 21 of the second plate 2 cannot be melted by the heat of the laser beam which is stored up in the first plate 1. When the generating power of the laser beam is more than 100 W, the first contact surface 11 of the first plate 1 and the second contact surface 21 of the second plate 2 may vaporize or may be transmuted, so that the first plate 1 cannot be joined to the second plate 2.

Figure 3:
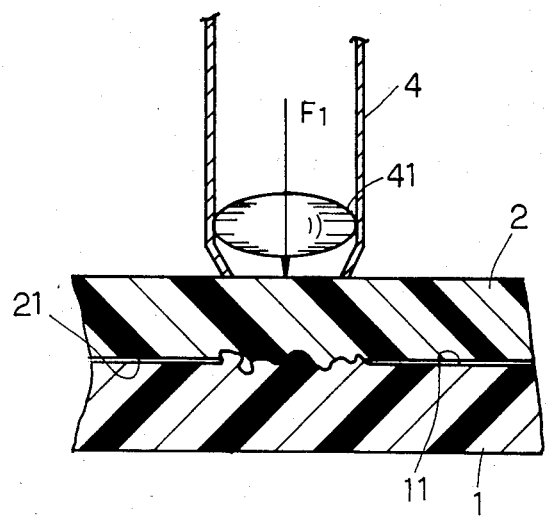
FIG. 3 is a cross-sectional view showing a fourth step of the process.
Figure 5:
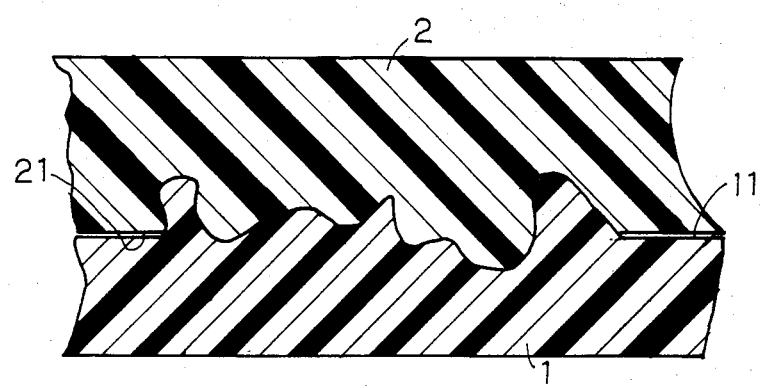
FIG. 5 is an enlarged view of a portion of FIG. 4 showing a first contact surface of a first kind of synthetic resin which is joined to a second contact surface of a second kind of synthetic resin.

As shown in FIG. 3, a fourth step of the process includes applying a downward compressive force "F$_1$" to the outer surface of the second plate 3 and the first plate 1 during exposing the second plate 2 to the laser beam. As best seen in FIG. 5, the melted first kind of synthetic resin of the first plate 1 is pressed into the plurality of recesses of the second contact surface 21 of the second plate 2. Similarly, the melted second kind of synthetic resin of the second plate 2 is pressed into the plurality of recesses of the first contact surfaces 1 of the first plate 1. Thus, a plurality of projections of the first contact surface 11 of the first plate 1 and a plurality of projections of the second contact surface 21 of the second plate 2 are formed. The force "F$_1$" preferably is applied to the second plate 2 through the nozzle 4 of the laser beam, though the downward compressive force "F$_1$" may be applied to the second plate 2 through a different device, and while or after the second plate 2 is being exposed to the laser beam.

Figure 4:
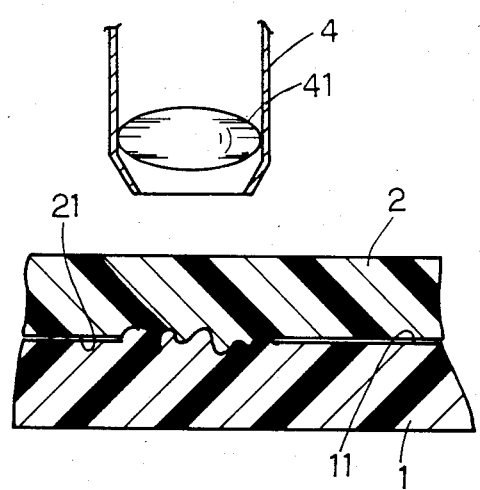
FIG. 4 is a cross-sectional view showing a fifth step of the process.

As shown in FIG. 4, a fifth step of the process includes stopping irradiation by the laser beam, and removing the nozzle 4 of the laser beam from the outer surface of the second plate 2. Concurrently, in the fifth step of the process, the downward compressive force "$F_1$" is removed from the second plate 2. Alternatively, the downward compressive force "$F_1$" may be removed from the second plate 2 after the nozzle 4 of the laser beam is removed from the outer surface of the second plate 2.

A sixth step of the process includes cooling the first plate 1 and the second plate 2, leaving the plurality of the projections of the first contact surface 11 of the first plate 1 engaged securely with the plurality of the recesses of the second contact surface 21 of the second plate 2, and vice-versa.

Therefore, by this process, the first kind of synthetic resin can be securely joined to the second kind of synthetic resin.

Figure 6:
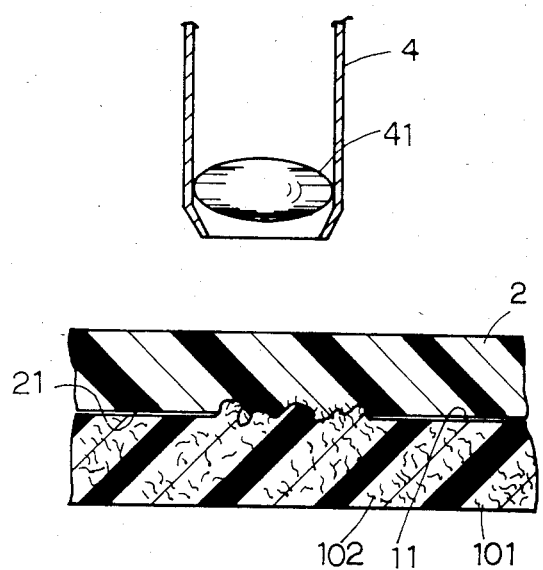
FIG. 6 is a cross-sectional view showing a fourth step of a second embodiment of a process according to the present invention, in which a first kind of synthetic resin includes fillers.
Figure 7:
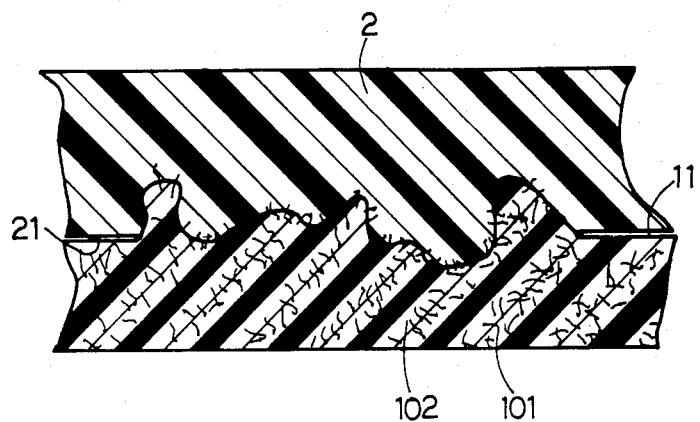
FIG. 7 is an enlarged view of a portion of FIG. 6 showing a first contact surface of the first kind of synthetic resin which is joined to a second contact surface of a second kind of synthetic resin.

FIG. 6 and FIG. 7 show a fifth step of a second embodiment of a process according to the invention for joining different kinds of synthetic resins. Most of steps of the process in the second embodiment are the same as steps of the process in the first embodiment which is described above, however, the second embodiment has several differences. Description will be given hereunder of the several differences in the second embodiment.

A first kind of synthetic resin of a first plate 101 is styrene acrylonitrile copolymer. The styrene acrylonitrile copolymer is reinforced with 20 wt % glass filler 102, and the styrene acrylonitrile copolymer includes 0.1 wt % carbon black as an additive. Alternatively, the filler 102 of the first kind of synthetic resin may be a metal filler or a carbon filler instead of the glass filler.

As shown in FIG. 8, the styrene acrylonitrile copolymer can transmit only a little of a Nd:YAG(Nd+3:$Y_3Al_5O_{12}$) laser beam. When the wavelength of the laser beam is 1.06 μm, the reinforced styrene acrylonitrile copolymer can transmit about 4% of a total amount of the Nd:YAG laser beam. Therefore, the styrene acrylonitrile copolymer can store up most of the heat of the total amount of the laser beam.

A second kind of synthetic resin of a second plate 2 is polypropylene resin which does not include any absorptive additives. As shown in FIG. 9, when the wavelength of the Nd:YAG laser beam is 1.06 μm, the polypropylene resin without any absorptive additives can transmit about 75% of the total amount of the Nd:YAG laser beam.

A third step of the process includes setting a nozzle 4 of the laser beam on an outer surface of the second plate 2, and exposing the outer surface of the second plate 2 to the laser beam. The laser beam radiates from the nozzle 4 through a convex lens 41, and an end of the nozzle 4 is in contact with the outer surface of the second plate 2.

When the outer surface of the second plate 2 is exposed to the laser beam, the second plate 2 transmits the laser beam, and the first plate 101 stores up the heat of the laser beam. Therefore, the first contact surface 11 of the first plate 101 and the second contact surface 21 of the second plate 2 are melted by the heat which is stored up in the first plate 101.

However, the glass filler 102 of the first plate 101 cannot be melted by the heat of the laser beam, and the glass filler 102 therefore floats in the first kind of synthetic resin melted from the first plate 1 and the second kind of synthetic resin melted for the second plate 2 because the glass filler has a higher melting point than melting points of the first kind of synthetic resin and the second kind of synthetic. As a result, as shown in FIG. 6 and FIG. 7, a plurality of the fibers of the glass filler 102 will have ends in the first plate 101 and opposite ends in the second plate 2. Accordingly, some of the glass filler securely connects the first plate 101 to the second plate 2.

Figure 10:
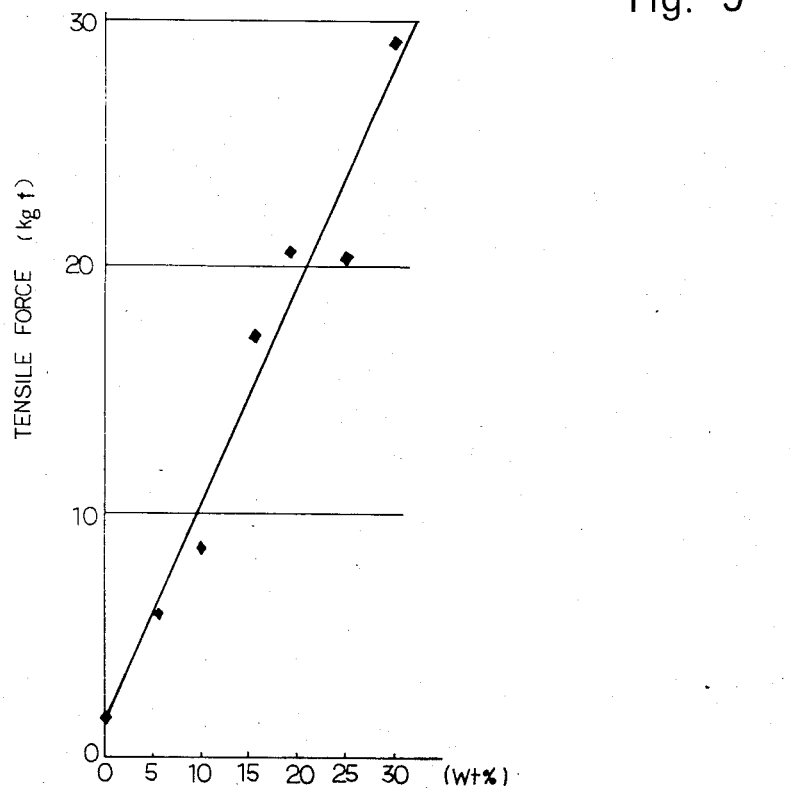
FIG. 10 is a diagram showing the tensile strength of glass filler reinforced styrene acrylonitrile copolymer.
Figure 11:
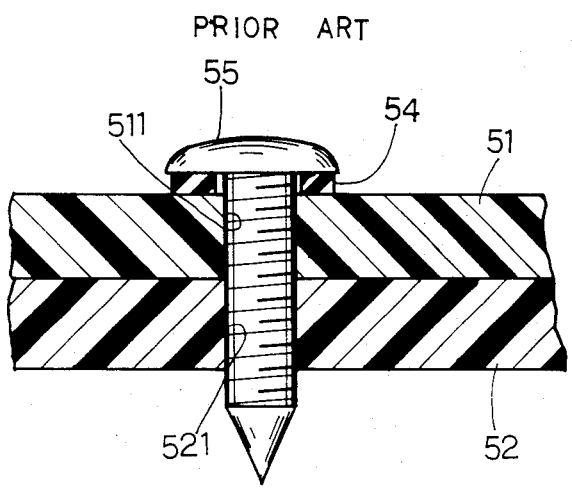
FIG. 11 is a cross-sectional view showing a third conventional process.

As shown in FIG. 10, the cohesiveness between the first plate 101 and the second plate 2 increases as the wt % of the glass filler increases. The data in FIG. 10 was obtained by joining the preferred first and second kinds of synthetic resins by the heat of a Nd:YAG laser beam, whose generating power is 87 W and whose wavelength is 1.06 μm.

Therefore, in the process of the second embodiment, the first kind of synthetic resin can be joined securely to the second kind of synthetic resin through the glass filler 102.

As has been described above, according to the process for joining different kinds of synthetic resins of the present invention, one kind of synthetic resin can be joined securely to a different kind of synthetic resin without any mechanical devices. Further techniques for joining different kinds of synthetic resins may be found in the following applications owned by applicant's assignee, filed concurrently with the present application and the disclosures of which are incorporated herein by reference: U.S. Ser. No. 720,153, filed Apr. 4, 1985; U.S. Ser. No. 720,156, filed Apr. 4, 1985; and U.S. Ser. No. 720,157, filed Apr. 4, 1985, all entitled "A Process for Joining Different Kinds of Synthetic Resins".

It should be apparent to one skilled in the art that the above-described embodiments are merely illustrations of a few of the many possible specific embodiments of the present invention. Numerous and varied other arrangements can readily be devised by those skilled in the art without departing from the spirit and scope of the invention, which is defined by the following claims.

What is claimed is:

1. A process for joining an article of a first kind of synthetic resin to an article of a second kind of synthetic resin comprising the steps of:
   providing a first article of a first kind of synthetic resin which can store up the heat of a laser beam;
   setting a second article of a second kind of synthetic resin on said first article, a first contact surface of said first article being in contact with a second contact surface of said second article, said second kind of synthetic resin being able to transmit said laser beam; and
   exposing an outer surface of said second article to said laser beam, whereupon said second article will transmit said laser beam to said first article, which will store up the heat of the laser beam so that the first contact surface of said first article and the second contact surface of said second article are melted thereby, and the first contact surface of said first article is joined to the second contact surface of said second article.

2. The process according to claim 1, wherein a plurality of projections and a plurality of recesses are formed on both the first contact surface of said first article and the second contact surface of said second article during said exposing step.

3. The process according to claim 2, wherein a plurality of the projections of the first contact surface of said first article engage with a plurality of the recesses of the second contact surface of said second article to join the first and the second articles.

4. The process according to claim 1, wherein said first kind of synthetic resin comprises styrene acrylonitrile copolymer having an absorptive additive.

5. The process according to claim 4, wherein the additive of the styrene acrylonitrile copolymer is carbon black.

6. The process according to claim 1, wherein said first kind of synthetic resin comprises polypropylene resin having carbon black as an additive.

7. The process according to claim 1, wherein said second kind of synthetic resin is selected from the group consisting of polypropylene resin, 6-nylon resin, 66-nylon resin and styrene acrylonitrile copolymer, all without any absorptive additives.

8. The process according to claim 1, wherein said laser beam is selected from the group consisting of a Nd:YAG laser beam, Nd:glass laser beam, ruby laser beam, helium:neon (He:Ne) gas laser beam, krypton (Kr) gas laser beam, argon (Ar) gas laser beam, hydrogen ($H_2$) gas laser beam and nitrogen ($N_2$) gas laser beam.

9. The process according to claim 1, comprising the additional step of setting a nozzle of said laser beam on the outer surface of said second article before said exposing step.

10. The process according to claim 1, wherein the wavelength of said laser beam is not greater than about 1.06 μm.

11. The process according to claim 1, wherein a generating power of said laser beam is from 5 W through 100 W in power.

12. The process according to claim 1, comprising the additional step of applying a compressive force to said second article and said first article during said exposing step.

13. The process according to claim 1, comprising the additional step of cooling said first article and said second article after said exposing step.

14. A process for joining an article of a first kind of synthetic resin to an article of a second kind of synthetic resin comprising the steps of:
providing a first article of a first kind of synthetic resin which can store up the heat of a laser beam and having a plurality of fibrous fillers;
setting a second article of a second kind of synthetic resin on said first article, a first contact surface of said first article being in contact with a second contact surface of said second article, said second kind of synthetic resin being able to transmit said laser beam; and
exposing an outer surface of said second article to said laser beam, whereupon said second article will transmit said laser beam to said first article, which will store up th heat of the laser beam so that the first contact surface of said first article and the second contact surface of said second article are melted thereby, and the first contact surface of said first article is joined to the second contact surface of said second article.

15. The process according to claim 14, wherein after said exposing step, at least some of the plurality of fibrous fillers have ends in the first article and opposite ends in the second article, whereby at least some of said filler connect the first article to the second article.

16. The process according to claim 15, wherein the fibrous fillers are selected from the group consisting of glass fillers, metal fillers and carbon fillers.

17. The process according to claim 15, wherein said first kind of synthetic resin is selected from the group consisting of styrene acrylonitrile copolymer and polypropylene resin, both having an absorptive additive.

18. The process according to claim 17, wherein the absorptive additive comprises carbon black.

19. The process according to claim 15, wherein said second kind of synthetic resin is selected from the group consisting of polypropylene resin, 6-nylon resin, 66-nylon resin and styrene acrylonitrile copolymer, all without any absorptive additives.

20. A process for joining an article of a first kind of synthetic resin to an article of a second kind of synthetic resin comprising the steps of:
providing a first article of a first kind of synthetic resin which can absorb the heat of a laser beam;
disposing a second article of a second kind of synthetic resin on said first article, a first contact surface of said first article contacting a second contact surface of said second article, said second kind of synthetic resin being able to transmit said laser beam;
transmitting said laser beam through said second article to said first article to heat up said first article, thereby melting said first and second contact surfaces of said first and second articles, and forming a plurality of projections and a plurality of recesses in each of said first and second contact surfaces;
pressing said first and second articles together so as to press said plurality of projections of said first contact surface into said plurality of recesses of said second contact surface, and said plurality of projections of said second contact surface into said plurality of recesses of said first contact surface; and
cooling said first and second articles, thereby leaving said pluralities of projections and pluralities of recesses engaged to join together the first and second articles.

* * * * *